United States Patent [19]

Ace

[11] Patent Number: 4,656,590
[45] Date of Patent: Apr. 7, 1987

[54] METHOD AND APPARATUS FOR MAKING PATTERNS FOR EYEGLASSES

[76] Inventor: Ronald Ace, 5200 J. Philadelphia Way, Lanham, Md. 20706

[21] Appl. No.: 669,167

[22] Filed: Nov. 7, 1984

[51] Int. Cl.⁴ .................... G06F 15/46; G06G 7/64; B24B 49/00; B24B 7/00
[52] U.S. Cl. .................... 364/474; 364/475; 51/165.72; 51/101 LG; 51/105 LG; 51/284 E; 351/177
[58] Field of Search .............. 364/474, 475, 476; 83/49, 59, 56, 747; 51/97 NC, 101 LG, 106 LG, 105 EC, 165.72, 105 LG, 284 R, 284 E; 351/42, 177; 409/2

[56] References Cited

U.S. PATENT DOCUMENTS

| | | | |
|---|---|---|---|
| Re. 31,247 | 5/1983 | Johnstone | 364/474 |
| 3,760,169 | 9/1973 | Paculat | 235/151.1 |
| 3,857,025 | 12/1974 | English et al. | 235/151.11 |
| 3,913,274 | 10/1975 | Raiford et al. | 351/177 |
| 4,007,559 | 2/1977 | Guillard | 51/101 LG |
| 4,031,445 | 6/1977 | Schmermund | 364/475 |
| 4,052,928 | 10/1967 | Pierrat et al. | 51/97 C |
| 4,063,390 | 12/1977 | Chevalier | 51/101 LG |
| 4,096,684 | 6/1978 | Akaba et al. | 51/101 LG |
| 4,162,527 | 7/1979 | Kilbane et al. | 364/474 |
| 4,170,092 | 10/1979 | Keane, Jr. | 51/284 E |
| 4,178,820 | 12/1979 | Gerber | 83/13 |
| 4,203,259 | 5/1980 | Haddock | 51/97 NC |
| 4,281,379 | 7/1981 | Austin | 364/200 |
| 4,327,615 | 5/1982 | Gerber et al. | 83/49 |
| 4,369,052 | 1/1983 | Hotmer | 364/476 X |
| 4,391,170 | 7/1983 | Boverman et al. | 83/71 |
| 4,394,099 | 7/1983 | Santinelli | 51/101 LG |
| 4,423,481 | 12/1983 | Reid-Green et al. | 364/474 |
| 4,428,055 | 1/1984 | Kelley et al. | 364/474 |
| 4,524,419 | 6/1985 | Headlund et al. | 51/165.72 |
| 4,551,810 | 11/1985 | Levine | 364/475 |
| 4,557,076 | 12/1985 | Helbrecht | 51/284 E |
| 4,608,891 | 9/1986 | Frisby et al. | 83/56 |

FOREIGN PATENT DOCUMENTS 2807268  8/1979  Fed. Rep. of Germany .... 51/284 E

Primary Examiner—Jerry Smith
Assistant Examiner—Jon D. Grossman
Attorney, Agent, or Firm—Jones, Tullar & Cooper

[57] ABSTRACT

A system for computerizing eyeglass geometrical frame pattern records at a central location for access by eyeglass retailers or wholesalers is disclosed. The pattern records are stored in a central computer in the form of instructions for a remote pattern cutting machine. The instructions define the shape of the eyeglass frame in quasi-polar coordinates, either using the frame's geometrical "box" center as the origin or using the optical center of the lens as the origin, the computer providing the desired conversion between the two pattern centers. When an optician has a call for edging a lens for a particular frame, the optician obtains the edge shape data from the central computer by specifying the frame and, if desired, by specifying the decentration of the optical center from the frame geometric center. The central computer may convert its frame shape data from the geometric center to the optical center, if desired, and then provides the necessary data for cutting the pattern. Data is transmitted to and is stored at a remote pattern cutter which then utilizes the data to cut a full-size pattern from an inexpensive plastic workpiece, or pattern blank. Then the optician may compare the pattern with the frame to make sure that it is correct before edge-grinding the lens to the shape of the pattern, thereby greatly simplifying the present labor-intensive process of preparing lenses for frames.

23 Claims, 8 Drawing Figures

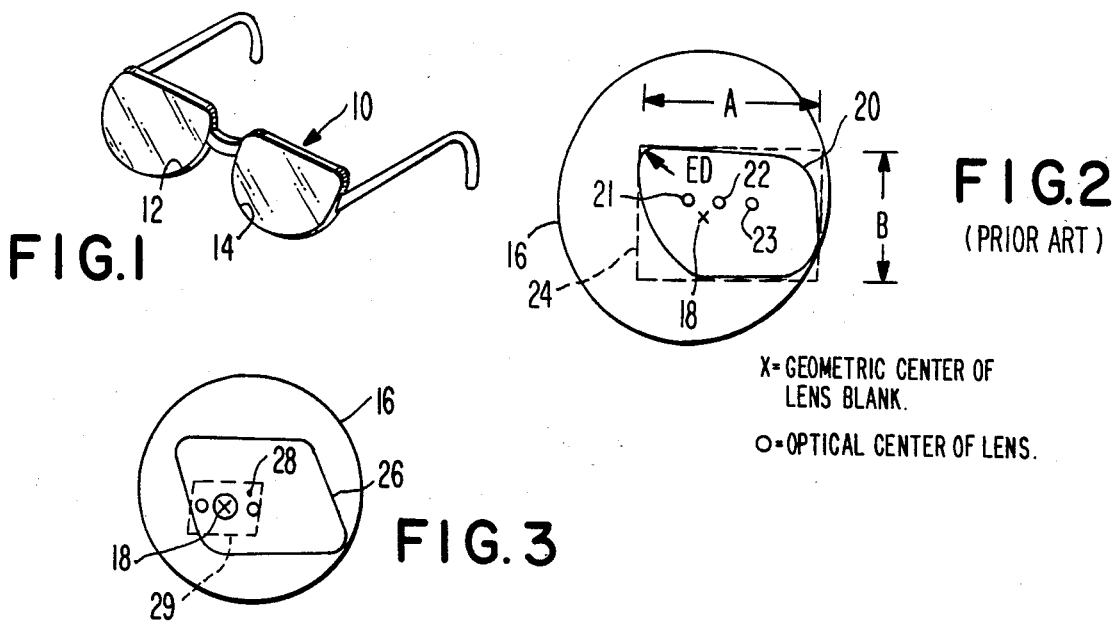
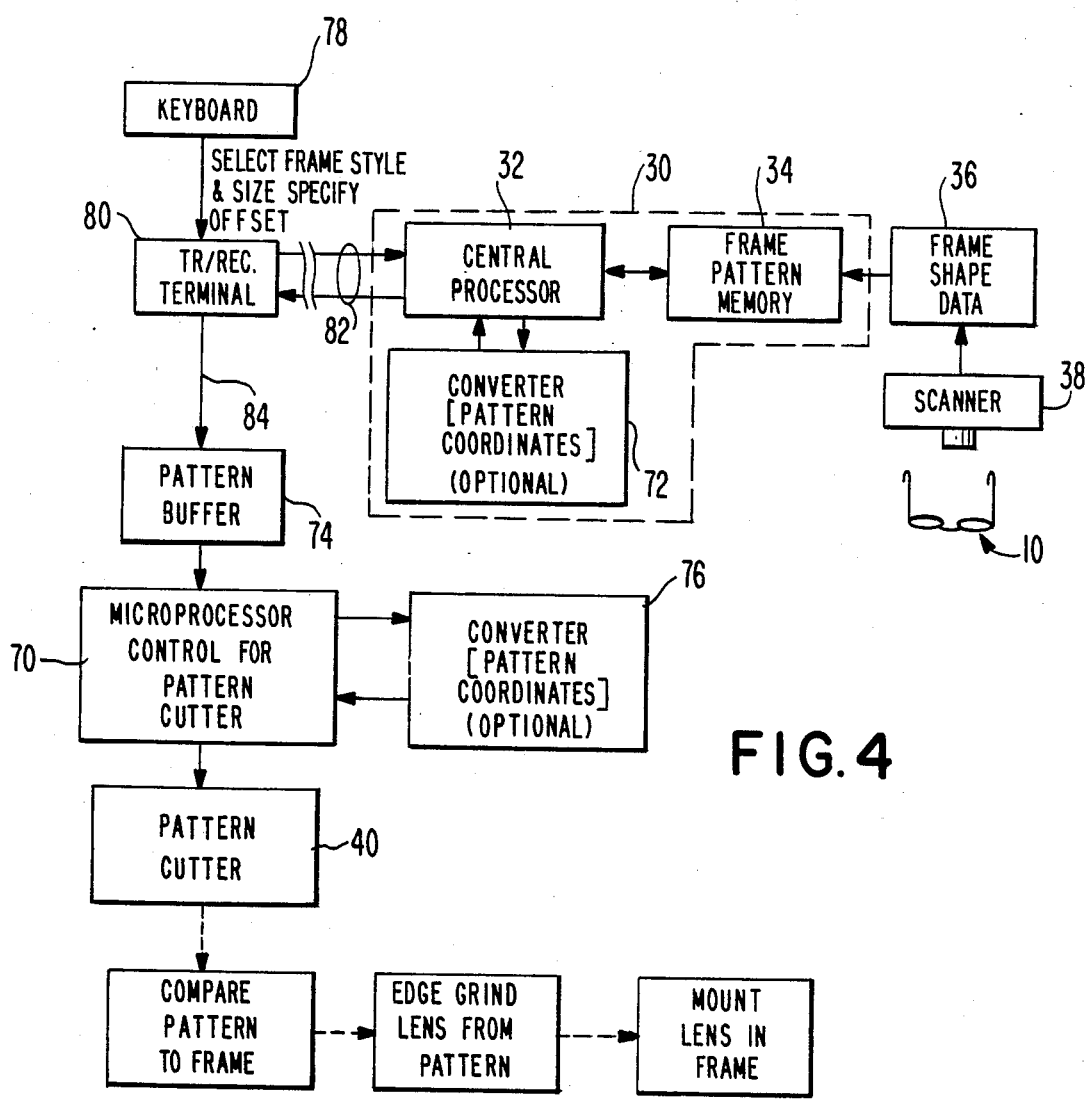

METHOD AND APPARATUS FOR MAKING PATTERNS FOR EYEGLASSES

BACKGROUND OF THE INVENTION

The present invention is directed, in general, to a method of making prescription eyeglasses, and more particularly to a method of shaping or edging prescription lenses to a desired shape to fit selected eyeglass frames.

Because eyeglass frame styles have become as much a matter of fashion as of function, and because of the rapid changes that occur in the world of fashion, the eyeglass frame industry has developed to the point where it produces thousands of new styles of frames every year, with each style being made in several sizes. Although a particular frame may typically stay in fashion for six months or so, the various styles tend to accumulate in stock and in the public domain for many years. Thus, there may be hundreds of thousands of different styles and sizes of eyeglass frames in use or available in the trade at any one time. To fit a particular eyeglass frame with a prescription or even a nonprescription lens, a retail optical or wholesale laboratory must shape a lens blank to fit the frame selected by the customer.

Lens blanks are generally round, are of a variety of standard diameters, and are ground and polished to the desired prescription. These lens blanks must be accurately edge-ground to the specific shape required by a particular frame. Because the safety of an eyeglass wearer is dependent on a tight precision fit of lens to frame for retention of the lens around its entire periphery, the edging of lenses to a frame is an exacting task. To aid in this, frame manufacturers routinely provide patterns shaped to match the shape of a particular frame, which patterns are then used as cams, or guides, for conventional edge grinders. The pattern is placed in the edge grinder, a size adjustment is made, and as the pattern is rotated, a follower arm traces its perimeter shape, translating that shape into a continously varying radial distance from the center of rotation of the pattern. The coaxial follower retains a lens blank and rotates the lens into a grinding wheel while, at the same time, varying the radial distance between the center of rotation of the lens and the surface of the grinding wheel. The lens rotates with the blank, so that the motion of the lens exactly follows the shape of the pattern and thus a lens blank is ground to the desired size and shape.

To permit widespread marketing of a frame, the pattern for that frame must be supplied to all the eyeglass retailers or wholesale eyeglass laboratories which might be required to produce a lens for that particular frame. Thus, for each new frame style, a manufacturer must make and distribute up to 40,000 patterns, depending on the number of retailers and laboratories in its marketing area. With 13,000 new styles and sizes available each year, and with each style requiring up to 40,000 patterns to be distributed, a staggering number of patterns may be required each year, with an annual unreimbursed cost to the frame manufacturers in excess of several million dollars per year.

These large numbers of patterns are not only a problem for frame manufacturers, but for retail and wholesale manufacturers as well, for it is the burden of retailers and wholesale laboratories to maintain an accurate inventory of these patterns, keeping track of them so that they can be quickly located when an order is received for a lens to fit a particular frame. Thus, the retailer or wholesaler must go to the expense of providing internal procedures to insure that patterns are available, and that a pattern is replaced in inventory immediately after use so that it can be found the next time. A large amount of storage space is required for all of these patterns, adding to the cost and creating an impossible task not only for small retailers, but for wholesale laboratories as well. The large numbers of patterns, their small size, and their similarities in shape all lead to severe problems in handling and lead to costly errors or delays in the production of lenses. In large pattern libraries, costs become prohibitive, forcing stores and laboratories to limit the availability of frame styles to only a small fraction of those currently available which, in turn, can lead to lost customers.

Retail stores or wholesale laboratories must maintain elaborate inventory systems which are labor-intensive and costly, and when, in spite of this, a pattern is lost, they must then face the choice of either losing the customer or making a pattern manually by tracing the frame and manually fabricating a pattern. This requires an investment in expensive machinery, leads to inaccuracies in the patterns, resultant errors in the lens grinding, requires extra labor, increases the cost of the lens and results in delays. In the case of partial or wholly rimless frames, where there is little or no frame to trace, the loss of a pattern means that the retailer must go back to the manufacturer for the pattern, leading to further delays in supplying the completed prescription glasses. Thus, the present system of pattern inventory is wholly unsatisfactory.

A further problem encountered in the process of producing prescription eyeglasses is that when a lens blank is being edge-ground to fit a particular frame, it is necessary accurately to position the optical center of the lens with respect to the frame so that the optical center for each lens in the frame coincides with the wearer's pupils. This requires a specific fitting of the frame and its lenses to the patient. The difficulty is that the optical center for a lens blank usually does not coincide with its geometric center after the lens has been ground and polished to prescription. Further, the frame manufacturer has no idea where the optical center must be located within a particular frame, since the manufacturer does not know who will be wearing that frame, and for this reason it is standard practice for the frame manufacturer to provide lens grinding patterns which use the "box" geometric centers of frames as their points of reference. A lens blank, on the other hand, is usually marked to identify its optical center, but not the frame geometric center; therefore, each time a lens is to be edged, it is necessary to calculate the location of its frame geometric center with respect to its optical center and to then mount, or block, the lens blank at its frame geometric center for edging under the control of the pattern. The location of the frame geometric center of the lens with respect to the lens optical center differs for each frame and each wearer and thus must be individually calculated using standard layout equipment in a separate manufacturing step. Such calculations are exceptionally subject to human error which can easily result in a pair of lenses being edged incorrectly. Since the margin of profit is very small in this field, particularly at the wholesale laboratory level, an error in one pair of lenses can result in a loss which offsets the profits from many correctly-ground pairs of lenses.

More particularly, under present practice, a lens blank is ground and polished to its prescription powers by first connecting a support block to the lens workpiece, then mounting it in grinding and polishing machinary to produce the desired prescription optics. The support block is then removed and the lens blank is tested to measure its compound optical powers, locate its cylinder axis and locate its optical center which is then marked on the lens blank. When the lens blank is to be edge ground and mounted in a frame, the marked optical center may not coincide with the pattern's geometric center, so it is necessary to locate the geometric center of the lens in order to cause the lens to rotate about the same axis as the rotational center of the frame and frame pattern, when the lens is remounted in the edger machinery. When all of this is done properly, the optical center of the lens will fall in the correct location for the patient within the frame when it is mounted. This location of the geometric center of the lens blank is accomplished on a "layout" blocking machine which is operated by hand to locate the geometric center with respect to the previously located optical center of the lens. The proper geometric center becomes the point to which a mounting block is secured to the lens, by which the lens may be mounted in the edge grinding machinery. This hand "layout" operation is a significant source of error in grinding lenses.

A further source of error in the process is the fact that a pattern usually is not formed in a one-to-one size ratio to the lens to be ground. Frames of the same shape generally are furnished in different sizes, but only a single pattern size is provided for each style. The edge grinding machine must be adjusted to grind a lens larger or smaller than the pattern, but in the same geometric shape. However, this means that a particular pattern cannot accurately be compared to the shape of a particular frame before the lens is ground, and thus it is possible to select the wrong pattern for a particular frame and have no way of knowing it until after the lens is ground incorrectly. Furthermore, since the size ratio must be set by hand on the machine, this is another operation which is very prone to human error, leading to additional lens spoilage and slowing down the processing of a prescription.

From the foregoing, it is seen that the present procedures for producing prescription lenses is inefficient, expensive, subject to error and delay, and thus is generally unsatisfactory.

SUMMARY OF THE INVENTION

It is an object of the present invention to overcome the problems of storage, inventory, recycling of patterns, and for avoiding delays, inaccuracies, and spoilage in the processing of prescription eyeglasses.

The system of the present invention incorporates a central computer having an extensive memory capable of storing the information required to produce hundreds of thousands of lens patterns, each pattern being stored in accordance with its frame style, size and manufacturer. The central computer memory bank may receive and store this information in various digital forms. Preferrably, measurements from the geometric center of a pattern to points along the peripheral edge of the pattern are used, the data being stored using polar coordinates of the peripheral edge points to thereby specifically define the geometric shape of the pattern. This information may be obtained by mechanically tracing the shape of a pattern provided by the manufacturer, by mechanically tracing the inner peripheral edge of a frame, by scanning a pattern or a frame by means of a video scanning device, or by any suitable, well known means for transferring a geometric shape to memory. In order to reduce the amount of information required to define a particular lens shape, it is contemplated that the angular components of the polar coordinates be preselected, for example at 1°, 2°, or 4° increments, so that only the radial distances need to be recorded. A further reduction in the data storage requirement can be obtained by simply storing the first radial value for the first angle, and thereafter storing only the changes in radius for each angular increment. In this manner, a frame shape can be accurately defined with 360, 180, or 90 values of radius, the number required depending on the resolution desired.

The central computer is connectable, for example by way of telephone lines, to a specific distant retail or wholesale laboratory location which has available to it a pattern cutter controllable by the shape data stored in the central computer. The pattern making machine preferrably includes a buffer memory which receives data selected from the central computer and stores it for use in automatically producing a pattern cut from, for example, a sheet of thin plastic material. Means such as a microprocessor at the pattern making machine, or suitable programming at the central computer, may be provided to convert the pattern data from polar coordinates based on the frame geometric center of the pattern to polar coordinates based on a selected optical center of the lens, which is decentered a defined distance from the frame geometric center. This allows the pattern to be cut using either the optical center of the lens or the geometric center of the frame, as desired.

In accordance with the process of the present invention, the person fitting the frames to the patient carefully measures the distance between the patient's eyes to determine the required location of the optical center in the frame that has been selected. Information concerning the identification of the frame and the location of the optical center are transmitted, for example by telephone line, to the central computer which then selects the data required for cutting a blank to the size and shape required. The polar coordinates of the selected information may then be shifted from the geometric center of the blank to the newly-defined decentered location of the optical center of the lens with respect to the frame, and that data is transmitted back to the requestor and is stored in a buffer memory at the frame pattern cutter. Alternatively, the data defining the pattern shape with respect to the geometric center of the frame may be transmitted by the central computer to the remote location, and decentered there to define the shape with respect to the optical center of the lens. The pattern cutter is then operated to cut out a pattern having the exact size and shape that will be required for making the lens which will fit in the selected frame. This pattern will have as its center of rotation the geometric center of the frame, or optionally the optical center of the lens. Upon completion of the pattern, it can be compared visually to the frame to make sure that it is correct. In addition, since the center of rotation of the pattern may be the optical center, that location can also be checked to determine that the pattern has been made correctly prior to risking lens spoilage.

Thereafter, the pattern is mounted on a conventional lens edge grinder with its center of rotation coinciding with the selected geometric or optical center of the lens to be produced, and the lens blank of the appropriate size is similarly mounted with its center of rotation at the selected frame geometric or lens optical center. If the optical center is selected as the center of rotation for the pattern, the necessity of locating the geometric center of the lens is avoided, and this completely eliminates the layout blocking stage, which is a critical source of error in conventional lens making. The lens may then be edge-ground in conventional manner with an assurance of accuracy and correct fit.

In a further embodiment of the invention, decentering of a pattern, a decentration of its center of rotation from the frame box geometric center to the optical center, can be accomplished in the cutting machine by mechanically shifting the pattern blank before it is cut. The axis of the pattern blank mounted on the drive motor is shifted away from the geometric center by means of an adjustable blank support head on the drive motor shaft. This support head may take many forms, but essentially allows the pattern drive head to be shifted along its X and Y axes perpendicular to the drive motor shaft to shift the geometric center of the plastic blank with respect to the axis of the drive motor, causing the blank to rotate about a point spaced from the geometric center. This decentered point of rotation corresponds to the optical center of the lens to be formed. The pattern blank is then rotated and cut to the shape of the desired geometrically centered pattern data by moving the blank toward and away from the cutter by distances corresponding to the polar coordinates of the desired pattern based on the geometric center. The resultant pattern is properly shaped, but with its new center of rotation shifted to the optical center of a specific prescription lens, for use in controlling the edge grinding of a lens blank which also is blocked and rotates about its optical center.

It will be evident that this procedure eliminates virtually all of the problem areas of the prior method of making eyeglasses, thus eliminating the need for large inventories of patterns, avoiding the need for large storage areas, and avoiding the multiple sources of error and delay that previously plagued this industry. Because the pattern can be made inexpensively and quickly, there is no need to maintain an inventory; the pattern can simply be thrown away after it has been used, or it, plus its cuttings, may be collected for recycling back into new blank patterns. The cost savings are further enhanced by reduced lens spoilage, which ordinarily is substantial, since errors due to sizing and relocation of the optical center are eliminated. The avoidance of numerous manufacturing steps that were previously done by hand reduces labor costs and increases productivity, thereby providing substantial advantages over prior methods.

BRIEF DESCRIPTION OF THE DRAWINGS

The foregoing and additional objects, features and advantages of the present invention will become apparent to those of skill in the art from a consideration of the following detailed description thereof, taken in conjunction with the accompanying drawings, in which:

FIG. 1 is a diagrammatic perspective illustration of a pair of eyeglass frames to be fitted with lenses;

FIG. 2 is a diagrammatic illustration of a conventional lens pattern and lens blank;

FIG. 3 is a diagrammatic illustration of a lens pattern in accordance with the present invention;

FIG. 4 is a diagrammatic illustration of the system of the present invention;

DESCRIPTION OF PREFERRED EMBODIMENT

Figure 5:
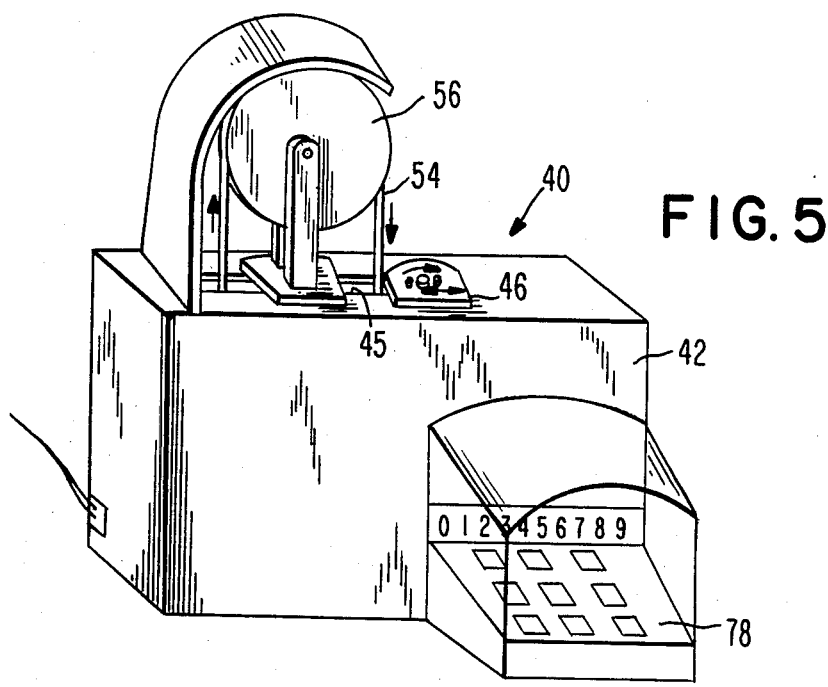
FIG. 5 is a perspective view of a pattern cutter suitable for use with the present invention.

Turning now to a more detailed consideration of the present invention, there is illustrated in FIG. 1 an eyeglass frame 10 of conventional construction and adapted to receive right and left lenses in the lens openings 12 and 14. A lens blank 16 (FIG. 2) having a diameter sufficiently large to accommodate the shape of the frame openings 12 or 14 is selected. The lens blank is optically ground and polished to the particular prescription required by the patient, and after grinding, has an optical center 18. This optical center must fall in alignment with the pupil of the patient's eye after the lens has been mounted in the frame, and accordingly it is necessary to edge grind the blank 16 to the desired shape in the customary way so that the optical center will be properly located.

The frame manufacturer supplies, with each frame style, a pattern which has a peripheral shape corresponding to the shape of the lens openings 12 and 14 but not necessarily the exact same size. Such a pattern is indicated at 20 in FIG. 2. Typically such a pattern is of plastic and incorporates mounting holes 21, 22 and 23, the hole 22 being at its geometric center. This is the "box frame" center, which is the center of a rectangle (or "box") 24 sufficiently large to enclose the pattern. Other conventions are used by other countries. Since many frames find their way into the U. S., such other conventions tend to confuse most opticians, giving them the impression that the patterns were manufactured incorrectly. The present invention allows the various conventions to be used, and insures that all pattern conventions not only may be stored, but always delivered.

The mounting holes 21, 22 and 23 allow the pattern 20 to be secured in a conventional edge grinding machine to control the motion of its grinding wheels in the machine. Since the pattern rotates about its frame geometric center, the lens blank must be similarly mounted to rotate about the point on the lens which corresponds to the center 22 of the pattern. Unfortunately, lens blanks are not produced with their frame geometric centers known or marked; instead, the optical center is found optically by means of a lensometer, and is narked with an ink dot reference point after the prescription is ground. The optical center normally does not lie on the frame geometric center, but is spaced therefrom a distance and direction which depends upon the prescription, the frame style and size selected by the patient, and on the patient's eyes.

In order correctly to mount the lens blank 16 for edge grinding in a conventional process, it is necessary for the lens maker to select a lens blank that will be large enough to accommodate the pattern 20 corresponding to the frame chosen by the patient, and to locate the frame geometric center of that lens which will correspond to the geometric center 22 of the pattern, and which will cause the optical center of the lens to be properly located. When both are placed in a conventional edge grinding machine, the pattern 20 and the lens blank 16 will rotate about corresponding axes. The resultant lens will be of the proper shape and proper size for frame 10, and will have its optical center 18 offset from its frame geometric center at 22 sufficiently far to place the optical center 18 in front of the pupils of the patient's eyes when the eyeglasses are being worn. This location of the frame geometric center conventionally involves a manual calculation through the use of a "layout blocking" machine after the pattern is selected and a lens blank of the correct size is found.

The pattern 20 supplied by the manufacturer is only one of many thousands which must be maintained by a retail optician's shop or by a wholesale eyeglass laboratory. As explained above, the maintenance of an inventory of patterns is a time consuming, labor-intensive and error-prone procedure which is a major cause for delay in supplying prescription eyeglasses and is a significant factor in increasing the costs of eyeglasses. Further, because of these problems the tendency for a retail outlet or laboratory is to reduce the number of frames carried in its stock, resulting either in dissatisfied customers or a need to make a special order from the manufacturers, resulting in additional work for the supplier and additional delays. The foregoing problems are overcome by the system and method illustrated in FIGS. 3 and 4. In accordance with one aspect of the present invention, a pattern 26 may be supplied with its center of rotation coinciding with the optical center 18 of the lens rather than the frame geometric center 28, as illustrated in FIG. 3. This allows the lens blank 16 to be supplied with a mounting block 29 at its optical center for mounting in the edge grinding machine. The pattern is similarly mounted, so that both the pattern 26 and the lens blank 16 rotate in the edge grinding machine about their optical axes, insuring that the lens blank will be edge-ground with greater accuracy. The mounting block 29 may be adhered to the lens blank 16 at the lensometer station in lieu of an ink dotting system of marking the optical center of the blank, upon completion of the prescription grinding and polishing.

A further aspect of the invention is illustrated by the system of FIG. 4, which includes a centrally located computer 30 having a central processor 32 and a lens pattern memory 34 adapted to receive and store data concerning each individual frame pattern made available by frame manufacturers. The pattern data is stored and indexed for easy recovery, and thus may be stored by frame manufacturer, style, and size. For example, a customer may select a frame style from the standard quarterly publication which shows all the frames available from various manufacturers. The data concerning frame shape may be stored in the main computer in accordance with the publication book number, the page number in the book, the frame number on that page, and the frame eye size for that style. This information completely and uniquely identifies the desired pattern with a pictoral, and the frame pattern data is thus indexed by means of such information. The frame pattern data is stored in the computer in a form usuable by a pattern cutting machine to control that machine and cause it to cut from a blank a pattern having the desired shape and size.

The frame pattern cutting data is supplied to the central computer 30 from a source 36 of frame shape data. This data may be provided directly by a manufacturer or may be derived either from the frame 10 or from a pattern 20, as by means of an electronic or video scanner 38. The scanner produces an image of the interior edge of the frame openings 12 or 14, or of the peripheral edge of the pattern 20 and produces corresponding digital data signals which are supplied to the data source 36 for subsequent storage in the frame pattern memory 34. In place of an electronic scanner, a mechanical tracing mechanism may be used, having a sensing finger which mechanically traces the interior edge of frame openings 12 or 14, or the peripheral edge of the pattern 20, with the motion of the sensing finger producing corresponding digital output signals for storage in the frame pattern memory.

In a preferred form of the invention, the peripheral edge shape of the pattern is stored in the pattern memory 34 in the form of polar coordinates having the geometric center of the pattern as their origin. The coordinates may include an angle ($\phi$) and a radius (R) for each of a plurality of peripheral locations to define the shape of the pattern. The storage requirements can be reduced, if desired, by establishing standard angular values, and storing only the corresponding radial distances in the computer. Thus, readings could be taken each 1° of arc, each 2°, each 4°, or the like, providing 360, 180, or 90 readings for each pattern, depending on the resolution desired. Once a standard is established, only the radial distances need be stored in the computer. Additional data storage compaction can be accomplished by storing the first radial value, and thereafter storing only changes in radial value. This information is stored in memory 34 until it is called up for use in guiding the remote pattern cutting machine.

Figure 6:
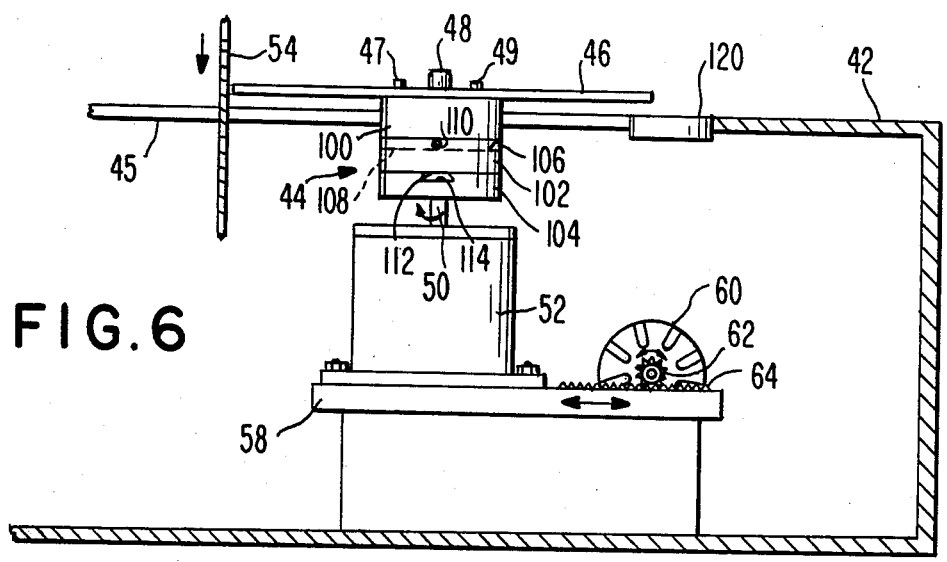
FIG. 6 is a diagrammatic illustration of an adjustable pattern blank support head and drive motor for the pattern cutter of FIG. 4.

Instead of having a huge inventory, each retail laboratory or wholesale lens-making laboratory only has a small microprocessor-controlled pattern cutter, indicated generally at 40 in FIG. 4 and in more detail in FIGS. 5 and 6. This cutter may include, for example, a housing 42 in which is mounted a rotatable work table 44 which extends through an opening 45 and is adapted to receive a pattern blank 46. The pattern blank is provided with mounting holes located near the center of the pattern blank (see FIG. 2) and adapted to receive mounting pins 47, 48 and 49 formed on the top of work table 44 and by which the blank is secured to the rotatable work table. The work table is supported on the shaft 50 of a drive motor 52, which preferably is a stepping motor adapted to step incrementally the same number of degrees as the angles selected for the pattern data values stored in memory 34. Thus, for example, if 180 data values are stored in the memory 34 to define the periphery of the pattern blank, the drive motor 52 will advance 2° for each of 180 steps to complete a single revolution and to thereby define the entire peripheral distance of the pattern.

Adjacent the pattern work table is a suitable cutter such as the vertical cutting wire or band saw blade 54 which is adapted to pass over guide pulley 56 mounted on housing 42 and to pass through aperture 45. The band saw blade is driven by a suitable drive pulley and blade motor (not shown) located within housing 42.

The work table 44 and drive motor 52 are mounted for reciprocation toward and away from blade 54, as by means of a sliding table 58 within housing 42. The sliding table 58 may be driven by a positioning stepping motor 60, drivingly connected to the table by means of gear 62 on the shaft of motor 60 and gear 64 on the table. Rotation of gear 62 moves the table 58 horizontally to vary the distance between the cutter blade 54 and the central mounting pin 48. The positioning motor 60 is under the control of the radial values from the computer 30, so that for each angular position of motor 52, the distance between pin 48 and blade 54 is adjusted. As the motor 52 turns, the radial distance varies to cut a pattern of the selected shape from blank 46.

The pattern cutting machine 40 preferably is controlled by a microprocessor 70 which is adapted to receive control information concerning the shape of the pattern to be cut from the central processor 32. That information preferably is in the form of polar coordinates based on the "box" geometric center of the pattern which is to be produced, in which case the pattern cut by machine 40 will have the geometric center of the pattern as its center of rotation at pin 48. Alternatively, the central processor may be provided with a converter 72 which mathematically converts the stored geometrically-centered lens pattern data to polar coordinates decentered to the prescribed optical center of the lens. As described above, the decentered value is offset from the frame geometric center by an amount which is determined by the patient, and the decentered polar coordinates define a new peripheral edge of the pattern from an origin defined by the optical center decentration. The frame pattern data provided by the central computer 30 may be temporarily stored in a pattern buffer 74 before being supplied to the microprocessor 70 for control of the cutter 40. If desired, the optional pattern conversion to decentered polar coordinates for the frame pattern may be carried out mathematically by a converter 76 connected to the microprocessor 70.

In accordance with the process of the present invention, a particular eyeglass frame 10 is selected by a patient, and the optician or other retail store personnel measures the patient's pupilary position with respect to the frame to determine the required location of the optical center for the lens which is to be mounted in that frame. The selected frame style and size as well as the optical decentration required to match the lens to the patient's pupils are entered by means of a keyboard 78 into a pattern maker terminal 80 which is located at the retail store, wholesale eyeglass laboratory, or other location remote from computer 30. The frame identification data is then automatically transmitted, as by way of telephone lines 82, to the central processor 32 in the computer 30. The decentration, or offset, data may also be sent to the central processor 32 if required for conversion of the frame pattern data at the converter 72. Alternatively the decentration data need not be transmitted, but can be retained and sent directly to the microprocessor 70, for use by converter 76 when the pattern data is received from computer 30.

Computer 30 preferably is a highly reliable duplexed computer which has sufficient backup capability to insure that it will always be available to users. The computer is at a central location convenient to many opticians and laboratories and carries in its frame pattern memory a complete listing of available frames and corresponding data describing the particular shape of each frame. The central processor 32 responds to the request for data concerning one or more frame styles and sizes (e.g., up to 10-20 frames at a time) and will select from memory 34 the proper data. Selected data is then either transferred back to terminal 80 or is transferred to the decentration converter 72, for conversion of the origin of the geometrically centered polar coordinates to the optical center of the lens. The decentered data is then returned to the terminal 80 by way of line 82.

The information received at terminal 80 is fed to the pattern buffer 74 by way of line 84 and thence to the microprocessor control 70 for the pattern cutter 40. If the polar coordinates were not converted in converter 72, that can be accomplished in converter 76. The pattern cutter 40 is then operated under the control of the microprocessor 70 to produce one full size pattern at a time for the lens(es) to be mounted in frame 10.

The pattern 26 produced by cutter 40 may have its center of rotation 18 corresponding to the optical center of the lens 16 which is to be edge-ground in accordance with the pattern. Since the pattern is full size, it can be inserted into and compared directly to the frame 10 by the optician to insure that the proper pattern has been identified and, if desired, to double-check the final location of the optical center with respect to the frame before the lens is edged. This insures that when the lens is finally ground, it will fit the frame and be correct for the patient. Thereafter, the lens blank 16 having a mounting block 29 at its optical center is placed in a conventional lens edge grinder and the pattern 26 is mounted to guide the edge grinder in the edging of the finished lens. It will be understood that since both lenses for the eyeglasses 10 are of identical shape, both may be formed from a single pattern, as is known in the art. In the rare case where each eye requires a different decentration, two patterns may be made, each with a special decentration. This allows the optician to bypass all of the layout operations for two patterns.

Upon completion of the lens edging and mounting of the lens in the frame, the pattern 26 may be discarded or the plastic, including the plastic waste, recycled, since the uniquely decentered pattern data can easily be retrieved again from the central computer 30 and quickly recut on the pattern making machine 40. Since the central computer can be quickly accessed by way of a telephone line, and the requested information obtained almost immediately, and since pattern blanks can be made of extremely inexpensive plastic sheets, the whole process of providing a blank for a specified frame is quick and very accurate compared to manual methods, as well as being inexpensive. Since it allows optical confirmation of the frame in advance this method avoids several sources of error common in prior practice.

An alternative to the mathematical decentering of the axis of rotation of a pattern explained above, is an improved mechanical decentration device which permits the pattern geometrical center to be offset from the axis of rotation of the cutter, so that during the cutting of the pattern blank the blank is caused to rotate asymetrically about the point which corresponds to the optical axis of the lens. This mechanical decentration is carried out by means of the pattern support table 44 illustrated in FIGS. 6-8. In this case, table 44 consists of three horizontal plates 100, 102 and 104 which are interconnected by dovetails extending in the X and Y directions to allow relative shifting of the plates. Thus, plate 100 incorporates a depending dovetail 106 which extends along the X-axis identified in FIG. 7 and engages a correspondingly-shaped groove 108 in the top of plate 102. This allows plate 100 to shift with respect to plate 102, but only along the X-axis. Suitable securing means, such as a set screw 110, may be provided to secure the tables together, once they are properly positioned.

Figure 7:
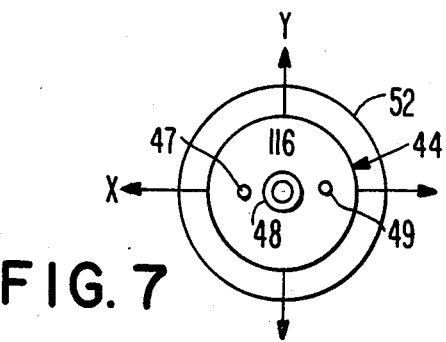
FIG. 7 is a top view of the support head of FIG. 6, in its normal configuration.

In similar manner, plate 102 may be interconnected with plate 104 by a dovetail 112 which is formed on the bottom of plate 102 at right angles to dovetail 106, and which extends along the Y-axis identified in FIG. 7. The dovetail 112 engages a corresponding groove 114 in plate 104 to allow relative motion between plates 102 and 104 along the Y-axis. Again, suitable securing means such as a set screw (not shown) may be provided to secure the plates.

Figure 8:
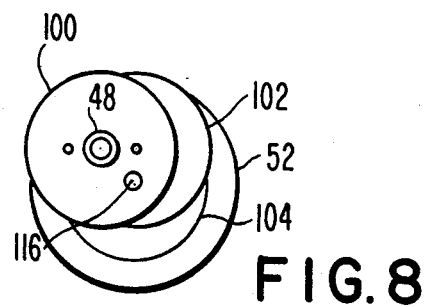
FIG. 8 is a top view of the support head of FIG. 6, shifted to provide an offset center of rotation.

In order to provide the desired X and Y, or vertical and/or horizontal, decentration between the geometric center of a pattern and the location of the optical axis, the plates 100 and 102 are shifted along the X and Y axes a sufficient amount to displace the mounting pin 48 away from the axis 116 of the motor drive shaft 50, as illustrated in FIG. 8. Thus, plate 102 is moved along the Y axis, and the plate 100 is moved along the X axis sufficiently far to obtain the desired decentration. The mounting pin 48 then receives the pattern blank 46 and it is rotated as before by the drive motor 52 and moved with respect to the cutting blade 54 to cut the desired pattern shape in accordance with the geometric frame data stored in the computer 30. The pattern blank rotates about axis 116, which defines the geometric center of the frame pattern, but the mounting pin is offset therefrom, and defines the location of the optical center of the lens to be formed from the pattern. The completed pattern can then be mounted in a lens edger by means of the mounting holes formed by pins 47, 48 and 49 for rotation about the optical center, and the lens can likewise be mounted for rotation about its optical center.

Although the offsets in the work table 44 can be adjusted manually, it is preferred that it be done automatically, using the offset dimension information stored in microprocessor 70 by way of keyboard 78. This may be accomplished by providing linear stepping motors (now shown) horizontally aligned with plates 100 and 102 along the X and Y axes. The motor 52 may then be stepped to its 0° position, and the X and Y axis offset information may be supplied by the microprocessor to extend the linear X and Y axis stepping motors to push the plates to their offset positions. The linear motors would then be deenergized, and the work table operated as before. Upon completion of a pattern, the linear stepping motors may be used with the motor 52 set to 180° to return table 44 to its zero position, illustrated in FIG. 7.

Automatic adjustment of the offset can also be accomplished with the same stepper motor 60 used to reciprocate the table 58, in combination with a positioning block, or detent, 120 formed on the edge of aperture 45. The detent is aligned with the plate 100 and is adapted to engage that plate when the table 58 is moved toward the right, as viewed in FIG. 6. When either of the dovetails 106 or 112 are aligned with the motion of the table 58, the motor 60 may be operated to press the plate 100 against the detent and cause the plates to shift with respect to each other. By controlling the rotation of the motor 60 and the position of shaft 50, exact positioning of the table 58, and automatic decentration of the work table 44, can be accomplished. For example, rotational motor 52 is first caused to position itself to 0° while translational motor 60 moves work table 44 away from the cutter blade far enough and to a known position against detent 120 so that the X dovetail 106 is forced to move a predetermined distance of decentration. The table is moved away from the detent, and motor 52 is turned to the 90° position. Motor 60 again moves work table 44 against detent 120, causing the Y dovetail 112 to move a known amount, completing the automatic decentering. The table 44 is moved away from the detent, and motor 52 quickly returns to its starting position (0°) and is ready to begin the cutting action.

When the cutting is completed, and the pattern removed from the work table 44, the motors 52 and 60 reverse the above step sequence, causing the X-Y plates 100 and 102 to resume axial alignment. However, to cause the coaxial alignment, motor 52 must first turn to 180° to force the X dovetail 106 back into coaxiality with the linear assistance of motor 60, and this sequence is followed by a 270° position of motor 52 so that the Y axis dovetail 112 is made coaxial again by motor 60. The above multisequential action can be accomplished in only a fraction of a second, with high speed stepping motors 52 and 60. While these settings are being done, the blank pattern may simultaneously be mounted and or removed, so that time is not lost. The primary advantages of this form of X and Y decentration are the lower degree of complexity, greater accuracy and speed, automatic operation, and lower cost.

Although the present invention has been dislcosed in terms of preferred embodiments, it will be apparent that numerous modifications and variations may be made without departing from the true spirit and scope thereof as set forth in the following claims.

What is claimed is:

1. A method for producing lenses for eyeglass frames, comprising;
    storing in a central computer memory frame peripheral shape data for each of a multiplicity of eyeglass frame styles and sizes;
    selecting a desired style and size of an eyeglass frame;
    measuring the location of the optical center of a lens to be mounted in the frame;
    determining the decentration of the lens optical center with respect to the geometric center of the selected frame;
    calling up from the central computer memory previously stored frame shape data corresponding to the selected frame;
    transferring the frame shape data to a pattern cutter controller;
    cutting a frame pattern for the selected style and size frame;
    comparing the cut frame pattern with the selected frame;
    edge grinding a lens blank to the size and shape of the lens pattern, using a common center of rotation for both the frame pattern and the lens blank, whereby a shaped lens is produced; and
    mounting the shaped lens in said selected frame.

2. The method of claim 1, wherein said frame shape data is stored in terms of polar coordinates having their origin at the geometric center of the frame.

3. The method of claim 2, further including, before cutting a frame pattern, the step of converting the called-up frame shape data to polar coordinates having their origin at a decentration location corresponding to the optical center of the lens blank to be mounted in said selected frame.

4. The method of claim 3, wherein the common center of rotation for both the frame pattern and the lens blank is the optical center of the lens blank.

5. The method of claim 4, wherein the step of converting the frame shape data is a mathematical conversion of the polar coordinates.

6. The method of claim 4, wherein the step of converting the frame pattern data is a mechanical adjustment of the pattern cutter.

7. The method of claim 6, wherein the step of converting the frame pattern data comprises adjusting a rotatable pattern blank work table in the pattern cutter to offset the axis of rotation of the work table from the center of the pattern blank.

8. The method of claim 7, wherein the adjusting of a rotatable work table comprises manually shifting the work table with respect to its rotational axis.

9. The method of claim 7, wherein the adjusting of a rotatable work table comprises automatically shifting the work table with respect to its rotational axis along X and Y axes to provide an offset equal to the decentration of the lens optical center with respect to the selected frame geometric center.

10. The method of claim 2, further including the step of locating on a lens blank the frame geometric center corresponding to the selected eyeglass frame, whereby the common center of rotation for both the frame pattern and the lens blank is the frame geometric center.

11. A system for producing lenses for eyeglass frames, comprising:
  storage means for storing in a central computer frame peripheral shape data for each of a multiplicity of frame styles and sizes;
  means at a location remote from said central computer for calling up from said storage means the frame shape data corresponding to a selected style and size of eyeglass frames;
  means for storing decentration data at the location remote from said central computer, said decentration data defining the offset between the optical center of a lens to be mounted in said selected style and size of eyeglass frame and the frame geometric center; and
  cutter means at said location from said central computer responsive to said called-up frame shape data and said decentration data for cutting a frame pattern corresponding to the selected style and size of eyeglass frame, whereby a frame pattern corresponding to the selected frame style and size is cut from a pattern blank for use in edge grinding a lens blank to fit said selected eyeglass frame.

12. The system of claim 11, wherein said frame shape data is stored in said central computer in terms of polar coordinates having their origin at the geometric center of the frame.

13. The system of claim 12, further including means at said central computer for converting said frame shape data to polar coordinates having their origin at a decentration location corresponding to the optical center of the lens blank to be mounted in said selected frame.

14. The system of claim 12 further including means at said cutter means for converting said frame shape data to polar coordinates having their orgin at a decentration location corresponding to the optical center of the lens blank to be mounted in said selected frame.

15. The system of claim 11, wherein said cutter means includes a pattern cutter and microprocessor control means for operating said pattern cutter in accordance with said called-up frame shape data.

16. The system of claim 11, wherein said frame shape data is stored in said central computer in terms of polar coordinates having their origin at the geometric center of the frame.

17. The system of claim 16, further including converter means for converting said frame shape data to polar coordinates having their origin at a decentration location corresponding to the optical center of the lens blank to be edge ground and mounted in said selected frame.

18. The system of claim 17, wherein said converter means is located at said microprocessor control means.

19. The system of claim 17, wherein said converter means comprises an adjustable work table for said cutter means.

20. The system of claim 16, wherein said cutter means comprises a work table for receiving a pattern blank having a geometrical center of rotation;
  means for rotating said work table about an axis;
  a cutter; and
  means for reciprocating said work table toward and away from said cutter, rotation and reciprocation of said work table being under the control of said frame shape data to produce a frame pattern having a shape and size corresponding to said selected frame.

21. The system of claim 20, further including converter means for converting said frame shape data to polar coordinates having their origin at a decentration location corresponding to the optical center of a lens blank to be edge ground and mounted in said selected frame.

22. The system of claim 21, wherein said converter means comprises means for shifting said axis of rotation of said work table away from said geometric center of rotation of said frame blank by an amount determined by said decentration data, whereby said frame pattern cut from said pattern blank will have a center of rotation corresponding to the optical center of the lens to be mounted in said selected frame.

23. The system of claim 22, wherein said work table comprises a first support plate;
  a second support plate slidably movable with respect to said first plate only along a first horizontal axis,
  a third support plate slidably movable with respect to said second plate only along a second horizontal axis; and
  means for selectively moving said second and third support plates along their respective horizontal axes to offset the center of said third support plate with respect to said first support plate.

* * * * *